(12) United States Patent
Barry

(10) Patent No.: US 6,939,594 B2
(45) Date of Patent: Sep. 6, 2005

(54) SELF-ADHESIVE LABELS AND MANUFACTURE THEREOF

(75) Inventor: David R. Barry, St. Louis, MO (US)

(73) Assignee: Inprint Systems, Inc., St. Charles, MO (US)

(*) Notice: Subject to any disclaimer, the term of this patent is extended or adjusted under 35 U.S.C. 154(b) by 0 days.

(21) Appl. No.: 10/361,030

(22) Filed: Feb. 10, 2003

(65) Prior Publication Data

US 2004/0157026 A1 Aug. 12, 2004

(51) Int. Cl.⁷ .................................................. G09F 3/04
(52) U.S. Cl. .................... 428/40.1; 40/310; 40/630; 283/81; 428/42.1; 428/42.2; 428/42.3; 428/43; 428/192
(58) Field of Search ............................... 428/40.1, 41.7, 428/42.1, 42.2, 42.3, 43, 192; 40/630, 310; 283/81

(56) References Cited

U.S. PATENT DOCUMENTS

| | | |
|---|---|---|
| 5,399,403 A | 3/1995 | Instance |
| 5,588,239 A | 12/1996 | Anderson |
| 5,679,427 A | 10/1997 | Instance |
| 5,860,238 A | 1/1999 | Anderson |
| 6,027,598 A | 2/2000 | Anderson |
| 6,037,029 A | 3/2000 | Instance |

Primary Examiner—Nasser Ahmad
(74) Attorney, Agent, or Firm—Rothwell, Figg, Ernst & Manbeck

(57) ABSTRACT

A self-adhesive label carried on a backing of release material comprising a multilaminar label portion having a front cover panel having an end, the multilaminar label portion having a first part, and a second part comprising the end of the front cover panel, and a self-adhesive support piece upon which the multilaminar label portion is disposed, the, support piece comprising first and second portions which are spaced apart to define a gap therebetween and at least one connecting portion extending across the gap and integrally connecting the first and second portions together, the first and second parts of the multilaminar label portion being respectively adhered to the first and second portions of the support piece, and the self-adhesive surface of the support piece being adhered to a backing of release liner.

24 Claims, 3 Drawing Sheets

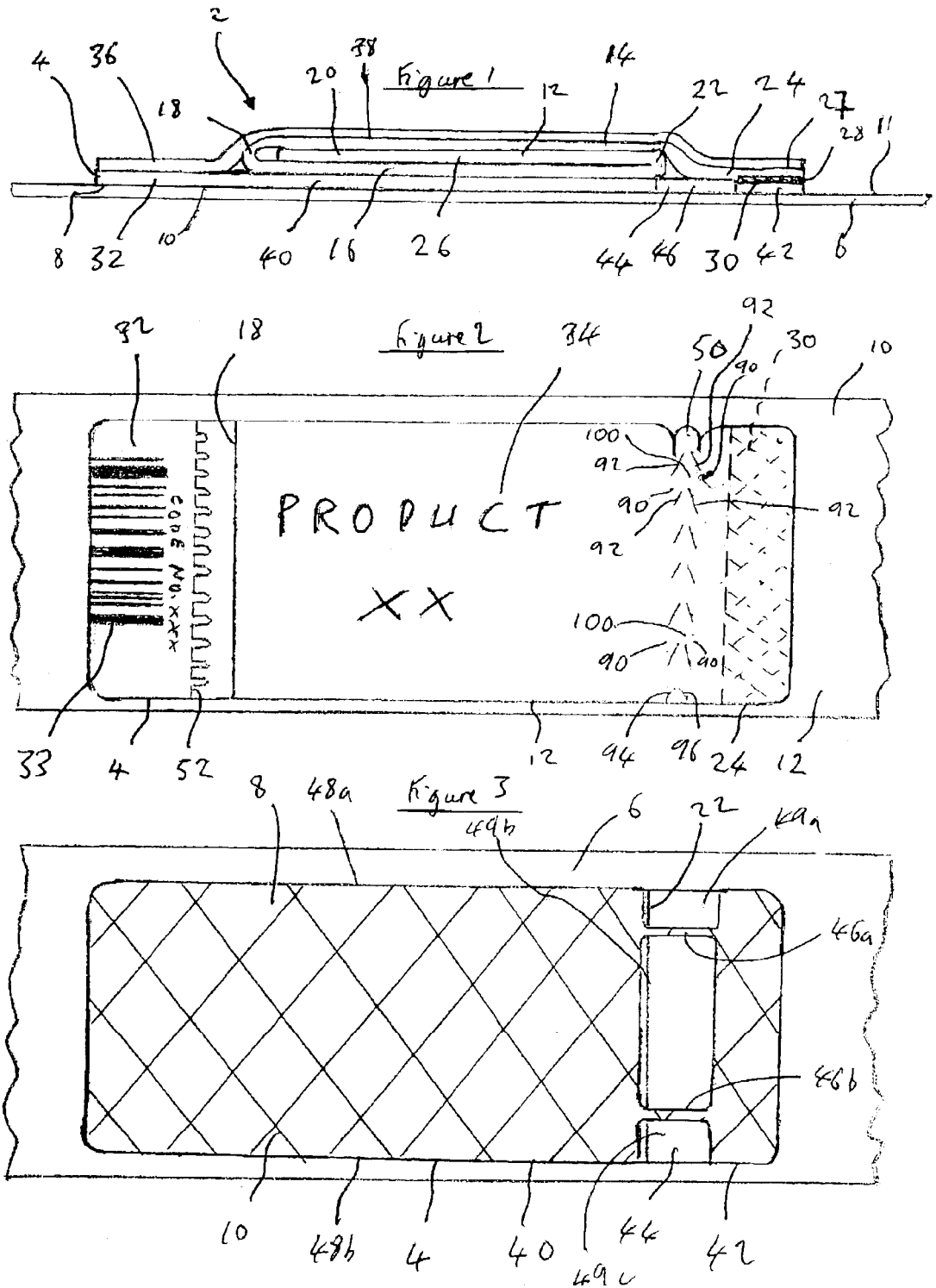

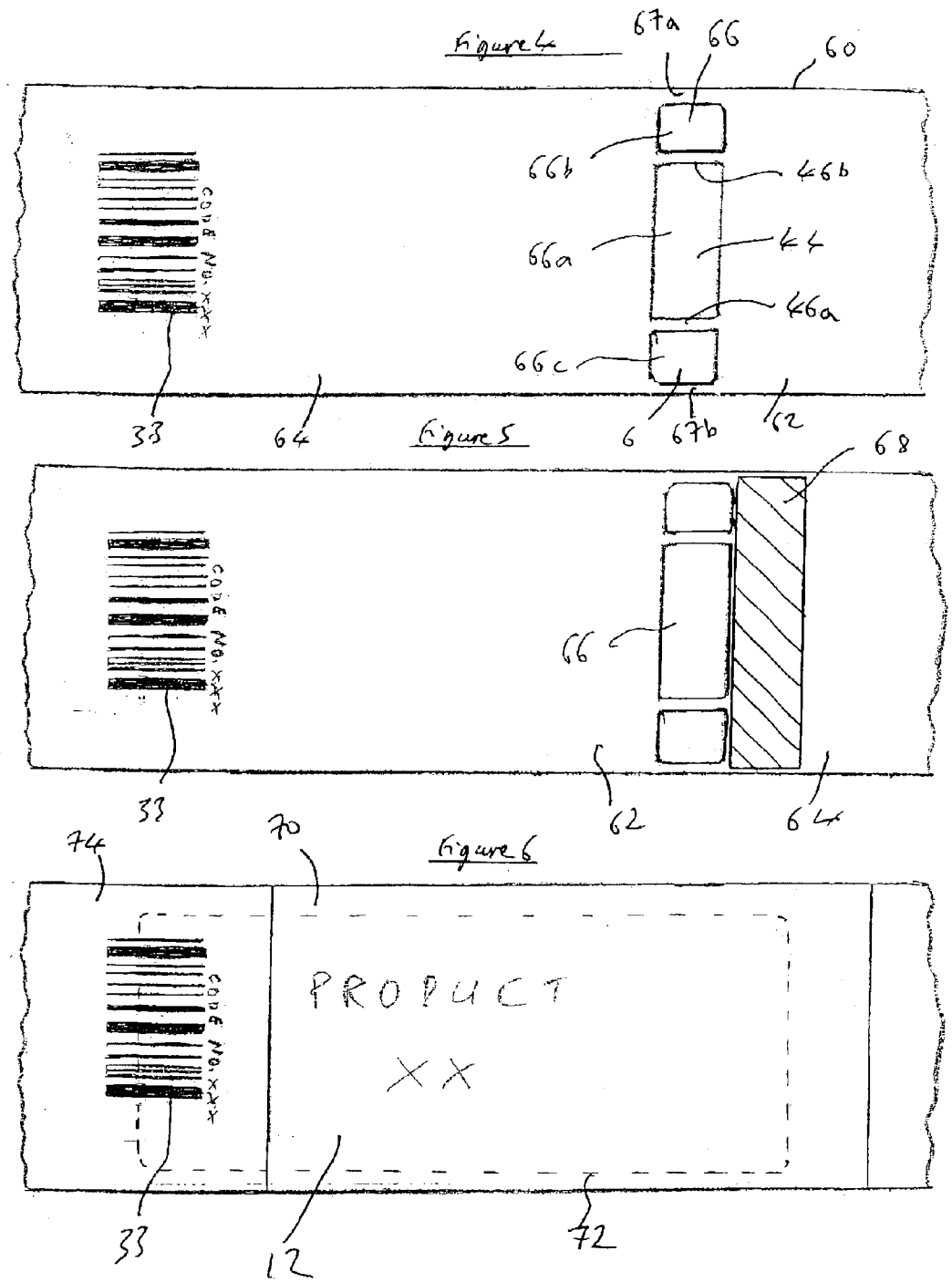

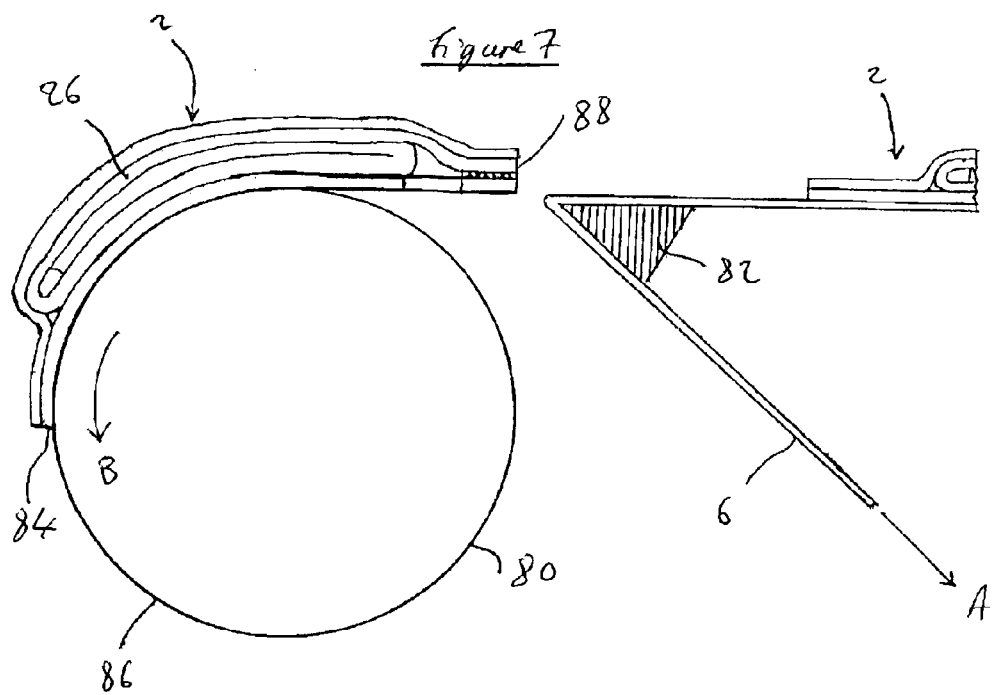
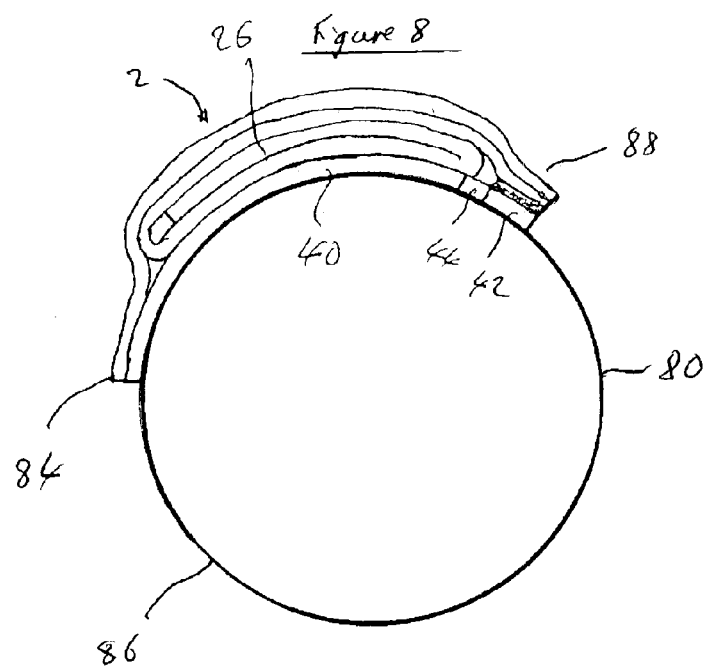

SELF-ADHESIVE LABELS AND MANUFACTURE THEREOF

BACKGROUND TO THE INVENTION

The present invention relates to a self-adhesive label and to a method of producing a self-adhesive label carried on a backing of release material.

Leaflet or booklet labels typically comprise a folded leaflet or booklet which is carried on an underlying self-adhesive support piece. Commonly, the leaflet or booklet is overlaminated with a self-adhesive transparent plastic overlaminate, which is typically adhered additionally to at least one exposed area of the support piece. The use of a single support piece, which defines the entire self-adhesive footprint of the self-adhesive label, is advantageous when the label is to be applied automatically and at high speed by a label applicator because a single base label keeps the label as a unitary "package" and the label can be reliably applied iin a closed configuration. However, when the support piece so defines the entire self-adhesive footprint of the self-adhesive label, it is often difficult to apply the label to a curved surface without encountering problems of inadvertent rucking or folding of the multiple layers of the labels, and/or without the folded leaflet or booklet inadvertently being opened as a result of tension in the layers caused by labelling around the curved surface.

A number of self-adhesive multilaminar leaflet or booklet labels are known, together with methods for their manufacture, which have a structure which permits the labels to be wrapped around and adhered to curved surfaces.

For example, U.S. Pat. Nos. 5,399,403, 5,679,427 and 6,037,029 disclose a multilaminar label in which a leaflet or booklet is adhered to a self-adhesive support piece and the entire assembly is covered with a self-adhesive plastic overlaminate. The self-adhesive support piece defines only part of the footprint of the label and a flap of the overlaminate is adhered directly to the backing of release liner (or product to which the label is adhered when the label is used) to keep the label ordinarily closed. This permits the label to be adhered to a curved surface without rucking or folding of the layers of the label, and without inadvertent opening. In order to open the label, the overlaminate flap is pulled upwardly away from its adhesive connection with the product so that the multilaminar leaflet or booklet, sandwiched between the overlaminate and the support piece, can be accessed.

U.S. Pat. Nos. 5,588,239, 5,860,238 and 6,027,598 all disclose expanded content labels adapted for application to curved surfaces and methods of production. The expanded content label includes a segmented, or multi-piece, base label which allows the entire label to conform to a curved surface. Gaps between the base label segments permit the label to move and flex about the curved surface. The labels disclosed in these three patents suffer from the problem of mis-labelling during application of the expanded content label to a product to be labelled, using automatic labelling machinery, which typically operates at a high labelling rate. As the label is fed off from the release liner web, the trailing end of the label being applied comprises an end portion of the covering overlaminate with one base label segment adhered thereunder. This trailing edge is free to move relative to the remainder of the label, when detached from the release liner but prior to application of the product. This can lead to the trailing edge being adhered to the product in slightly the wrong position, possibly leading to unsightly rucking or folding of the outer layer(s) of the label.

The present invention aims to provide an improved self-adhesive label and method of producing such labels.

It is another aim of the present invention to provide a self-adhesive label which is adapted to label curved surfaces and can be reliably applied to containers to be labelled using automatic labelling apparatus.

It is a further statement of the present invention to provide a self-adhesive label which encounters reduced mis-labelling problems during automatic labelling of containers to be labelled.

SUMMARY OF THE INVENTION

Accordingly the present invention provides a self-adhesive label carried on a backing of release material comprising a multilaminar label portion having a front cover panel having an end, the multilaminar label portion having a first part, and a second part comprising the end of the front cover panel, and a self-adhesive support piece upon which the multilaminar label portion is disposed, the support piece comprising first and second portions which are spaced apart to define a gap therebetween and at least one connecting portion extending across the gap and integrally connecting the first and second portions together, the first and second parts of the multilaminar label portion being respectively adhered to the first and second portions of the support piece, and the self-adhesive surface of the support piece being adhered to a backing of release material.

In a particularly preferred embodiment of the self-adhesive label of the invention, the self-adhesive label further comprises a self-adhesive laminar material overlying and adhered by the self-adhesive surface thereof to the upper surface of the multilaminar label portion. An end part of the self-adhesive laminar material may be adhered by the self-adhesive surface thereof to an end part of the second portion of the support piece.

The present invention further provides a method of producing a succession of self-adhesive labels carried on a length of release backing material, the method comprising the steps of:

(a) providing a labelstock web comprising an upper self-adhesive web coated on its rear face with a pressure-sensitive adhesive and a lower web of release liner;

(b) die-cutting a succession of sets of windows in the upper self-adhesive web and removing the resultant cut-out window portions from the release liner, each set of window portions defining a longitudinally extending gap and at least one connecting portion of the upper self-adhesive web extending across the gap;

(c) providing a plurality of multilaminar labels, each having a front cover panel having an end, the multilaminar labels having a first part and a second part comprising the end of the front cover panel;

(d) disposing the multilaminar labels in succession over the die-cut labelstock web, each multilaminar label covering a respective set of window portions whereby the first and second parts of each multilaminar label are disposed on opposed sides of a respective gap;

(e) adhering the first and second parts to the upper self-adhesive web; and (f) die-cutting through the multilaminar labels as far as the release liner thereby to form a plurality of self-adhesive labels, each self-adhesive label comprising a self-adhesive support piece upon which a multilaminar label portion is disposed, the support piece comprising first and second portions which are spaced apart to define the gap therebetween and at least one connecting portion extending across the gap and integrally connecting the first and second portions together, the first and second parts of the multilaminar label portion being respectively adhered to the first and second portions of the support piece.

The present invention yet further provides a self-adhesive label carried on a backing of release material comprising a multilaminar label portion having a first part and a second part, and a self-adhesive support piece upon which the multilaminar label portion is disposed, the support piece having at least one opening formed therein between first and second portions of the support piece to define in the support piece at least one longitudinally extending portion which integrally connects the first and second portions together, the first and second parts of the multilaminar label portion being respectively adhered to the first and second portions of the support piece, and the self-adhesive surface of the support piece being adhered to a backing of release liner.

BRIEF DESCRIPTION OF THE DRAWINGS

Embodiments of the present invention will now be described by way of example only, with reference to the accompanying drawings, in which:

FIG. 1 is a side view of a self-adhesive label carried on a backing of release material in accordance with a first embodiment of the label of the present invention;

FIG. 2 is a top plan view of the self-adhesive label carried on a backing of release material of FIG. 1;

FIG. 3 is a rear underside view of the self-adhesive label carried on a backing of release material of FIG. 1, the release material being transparent;

FIG. 4 shows a printed labelstock material, comprising a self-adhesive web for forming a succession of support pieces for a corresponding succession of the self-adhesive labels of FIG. 1, the web being releasably adhered to a backing of release material, after an initial die-cutting step to produce a succession of a plurality of windows in the self-adhesive web in accordance with an embodiment of the method of the present invention;

FIG. 5 shows the labelstock material of FIG. 4 after application of a succession of adhesive layers to the upper surface of the self-adhesive web;

FIG. 6 shows the labelstock material of FIG. 5 after application of a succession of folded leaflets to the upper surface of the self-adhesive web;

FIG. 7 shows the self-adhesive label of FIGS. 1 to 3 during the labelling of a cylindrical container; and FIG. 8 shows the self-adhesive label of FIGS. 1 to 3 when labelled on the cylindrical container of FIG. 7.

DETAILED DESCRIPTION OF THE PREFERRED EMBODIMENTS

Referring to FIGS. 1 to 3, there is shown the construction of a self-adhesive label in accordance with an embodiment of the present invention. In FIG. 1, the thickness of the various layers of the label is exaggerated for clarity of illustration.

The self-adhesive label, designated generally as 2, comprises an underlying self-adhesive support piece 4 which is adhered to a backing web of release material known in the art as release liner 6 (which is shown as transparent so that the rear surface 8 of the support piece 4 is shown in FIG. 3) by a layer 10 of pressure-sensitive adhesive on the rear surface 8 of the support piece 4. The release liner web 6 is typically coated on its upper surface 11, to which the self-adhesive label 2 is temporarily adhered, with a release material, typically a silicone.

The self-adhesive labels 2 are provided in reel form on the release liner 6 and are intended to be applied automatically to products to be labelled. It is conventional to provide only a single label across the width of the release liner 6.

A multi-laminar label portion comprising a folded leaflet 12 is disposed on the support piece 4. The folded leaflet 12 comprises a front panel 14 covering and connected to at least one other panel. In the illustrated embodiment the at least one other panel comprises a rear panel 16, which is connected to the front panel 14 by a fold line 18, which is transversely directed across the width of the self-adhesive label 2, and an additional panel 20 which in turn is connected to the rear panel 16 by a second transversely directed fold line 22 so as to be sandwiched between the front panel 14 and the rear panel 16. However, in alternative embodiments the folded leaflet may have a different fold configuration and/or greater or fewer panels, and instead of comprising a folded leaflet, the multi-laminar label portion may comprise a booklet having a bound or folded edge typically at the location of the fold line 18.

The front panel 14 has a free end 24 thereof which extends away from the remainder, comprising a body portion 26, of the folded leaflet 12. In order to retain the first panel 14 of the folded leaflet 12 in a closed configuration, the transversely directed edge portion 27 of the rear surface 28 of the free end 24 is adhered to the support piece 4 by a transversely directed layer of adhesive 30, which is additionally shown in phantom in FIG. 2. The adhesive 30 is typically a permanent adhesive, e.g. pva adhesive. As is shown clearly in FIG. 2, the support piece 4 includes an end portion 32 thereof which is at an opposite transverse edge of the self-adhesive label 2 from the free end 24 of the front panel 14. The end portion 32 is not covered by the folded leaflet 12 but is left exposed. As shown in FIG. 2, the front surface of the end portion 32 of the support piece 4 may be printed with a printed image 33 (although it may be left unprinted), and the folded leaflet 12 is itself printed, for example with a printed image 34, on the front panel 14 of the folded leaflet 12.

As is shown in FIG. 1, an overlaminate 36, which typically comprises a transparent self-adhesive plastics film, is adhered by its self-adhesive surface over the entirety of the upper surface of the assembly of the folded leaflet 12 on the support piece 4. The overlaminate 36 is adhered to the end portion 32 of the support piece 4 and to the upper surface 38 of the front panel 14 of the folded leaflet. The overlaminate 36 thereby adheres the body portion 26 of the folded leaflet 12, apart from the free end 24, to the support piece 4 so as securely to retain the folded leaflet 12 on the support piece 4, and to keep the folded leaflet 12 in a folded configuration. In the illustrated embodiment, the overlaminate 36 constitutes the entire upper surface of the self-adhesive label 2, but if desired in alternative embodiments, the overlaminate 36 may leave exposed the upper surface of the support piece and/or the multi-laminar label portion, and/or may extend beyond the support piece and/or the multi-laminar label portion.

In accordance with the present invention, the self-adhesive support piece 4 comprises first and second portions 40,42. The first and second portions 40 and 42 are spaced apart so as to define a gap 44 therebetween. At least one connecting portion 46 of the support piece 4 extends across the gap 44, in a bridging fashion, and thereby integrally connects together the first and second portions 40 and 42 of the support piece 4. A first part of the folded leaflet 12, comprising the majority of the folded leaflet 12, in the embodiment comprising the body portion 26 which includes the front panel 14 apart from the free end 24 thereof, the rear panel 16 and the additional panel 20, is adhered to the first portion 40 of the support piece 4 by the overlaminate 36 and a second part of the folded leaflet 12, comprising the transversely directed edge portion 27 of the free end 24 of the front panel 14, is adhered to the second portion 42 of the support piece 4 by the adhesive layer 30.

In the illustrated embodiment there are two parallel connecting portions 46a,46b each located transversely inwardly of a respective longitudinal edge 48a,48b of self-adhesive label 2. In the illustrated embodiment the connecting portions 46a,46b are constituted by narrow longitudinally directed straight arms of the support piece 4. However, other shapes, orientations and numbers of the connecting portions may be provided in alternative embodiments.

Typically, the support piece material forming the connecting portions has a thickness ranging from 0.063 to 0.127 mm, most typically about 0.076 mm, and the connecting portions have a width ranging from 0.8 to 4 mm, most typically about 1.6 mm. Typically, the gap has a width ranging from 3 to 25 mm, most typically about 10 mm.

In the self-adhesive label 2 therefore, a single self-adhesive support piece 4 is provided from which portions have been removed so as to leave only a small portion, defined by the connecting portions 46a,46b, of the support piece 4 connecting the entire length of the support piece 4 together in a longitudinal direction. The portions removed from the single support piece 4 constitute openings or windows, in the illustrated embodiment windows 49a,49b, 49c, in the support piece 4 which define the gap 44. The formation of these openings or windows 49a,49b,49c by removal of material from a single support piece 4 creates areas of the support piece 4, in particular the connecting portions 46a,46b, which do not crumple to a sufficient degree to cause folding or rucking in the outer sheets of the label when then label is disposed around a curved surface, while retaining the single self-adhesive support piece 4 with its attendant advantage of providing a unitary package for application to a container surface, with a single self-adhesive surface constituting the self-adhesive footprint of the label.

A tear strip 50 is formed through the overlaminate 36 and at least partially through the free end 24 of the front panel 14 at a location substantially overlying the gap 44 between the first and second portions 40 and 42 of the support piece 4. A tear line 52 extends through the overlaminate 36 and, although this is only optional, in this embodiment at least partially through the end portion of the support piece 4 at a location parallel to and spaced from the folded edge 18 of the folded leaflet 12.

In alternative embodiments of the self-adhesive label of the invention, the windows or openings, defining the connection portions, in the self-adhesive support piece may be provided in other locations of the label, for example under the body portion 26 of the label, most typically located slightly centrally inwardly of the edge of the body portion other than the front panel 14 (represented by the folded edge 22 in the illustrated embodiment). When the window or openings are located under the body portion of the label, this provides the advantage that the windows or openings in the support piece are concealed by the body portion of the label even when the label is open, giving the appearance of a single "solid" support piece being present in a self-adhesive label.

In further alternative modifications of the label of the invention, the end portion of the support piece may be omitted, particularly in embodiments where no overlaminate is incorporated in the label, and/or the rear panel may be adhered to the support piece by a layer of adhesive. In other modifications of the label of the invention, the front panel is not provided with a free end but instead with a folded edge connecting with an additional panel of the leaflet which is folded behind the front panel and has a rearwardly directed margin which is adhered to the support piece so that the front panel is indirectly adhered to the support piece by the additional panel to keep the leaflet closed. One or more further panels may be connected to the additional panel.

An embodiment of a method for producing the self-adhesive label 2 of FIGS. 1 to 3 as illustrated in FIGS. 4 to 6.

Referring to FIG. 4, initially a web 60 of labelstock material is provided, the labelstock material 60 comprising a two-ply web consisting of an upper self-adhesive web 62, typically of paper, which is coated on its rear face with pressure-sensitive adhesive and a lower web of the release liner 6, which releasably covers the self-adhesive surface of the upper self-adhesive web 62. Such labelstock material is well known in the art of making self-adhesive labels. The self-adhesive web 62 is ultimately die-cut to form a succession of the support pieces 4 of the self-adhesive labels 2 of the invention. The upper surface 64 of the upper self-adhesive web 62 is initially printed in known manner with a succession of images 33, one for each ultimate self-adhesive label 2. In FIGS. 4 to 6 only one of the images 33 is shown and correspondingly the manufacture of only one label 2 of the succession is shown. As is well known in the art, a succession of labels are produced along the length of the web 62, each incorporating a respective image 33. Before or after the printing step to print printed images 33, a series of windows 66 are die-cut out of the upper self-adhesive web 62. The windows 66 are cut in a die-cutting step in which a die-cutting element (not shown), typically a roller, cuts through the upper self-adhesive web 62 as far as, but not through, the release liner 6. Thereafter the cut-out window portions are removed, for example by suction or by passing the labelstock material web 60 over a re-entrant angle, so as to define a succession of sets of windows 66 in the self-adhesive web 62. Each set of windows 66 extends transversely across the self-adhesive web 62 ultimately present in a respective self-adhesive label 2. As shown in FIG. 4, in the illustrated embodiment, each set of windows 66 is formed as a central window 66a and two opposite edge windows 66b,66c so as to define the gap 44 and the connecting portions 46a,46b present in the support piece 4 of a resultant self-adhesive label. The edge windows 66b, 66c terminate short of the respective longitudinal edge of the self-adhesive web 62 to enable the subsequent final die-cutting step, described hereinafter, to form a waste matrix, including edge portions 67a,67b capable reliably of removing waste portions of the self-adhesive web 62 from the release liner 6.

Thereafter, as shown in FIG. 5, a layer of adhesive 68 is applied to the upper surface 64 of the self-adhesive web 62 at a location adjacent each respective set of windows 66 whereby the adhesive can, in the ultimate self-adhesive label as shown in FIGS. 1 to 3, constitute the adhesive layer 30 to adhere a free end 24 of the front panel 14 to the support piece 4.

Subsequently, as shown in FIG. 6, a multi-laminar label portion in the form of a folded leaflet 12 is applied over the set of windows 66 and the adhesive layer 68, with the folded leaflet 12 being applied in registry therewith and in registry with the printed image 33. The entire assembly is then overlaminated with a self-adhesive overlaminate web 70, which preferably covers the entire upper surface of the assembly of the succession of folded leaflets 12 on the labelstock web 60. The resultant assembly is shown in FIG. 6. Thereafter, a succession of individual self-adhesive labels 2, as shown in FIGS. 1 to 3, are die-cut by die-cutting downwardly, as far as but not through the release liner 6, through the overlaminate web 70, through the folded leaflet 12 and through the self-adhesive web 62 to form a succession of self-adhesive labels 2. The die-cut line 72 defining the peripheral edge of the ultimate self-adhesive label is shown in phantom in FIG. 6. The die-cutting step also cuts through the overlaminate web 70 and the front cover 14 of the folded leaflet 12 (and not the self-adhesive web 62, particularly when the connecting portions 46a,46b are located under the tear strip 50) to form the tear strip 50 and through the overlaminate web 70 and the self-adhesive web 62 to form the tear line 52 in the resultant self-adhesive label 2 as shown in FIG. 2.

The die-cut depth through the overlaminate web 70 and through the front cover 14 is controlled so that the die-cut does not extend below the rear surface of the front cover 14 so that the connecting portions 46a,46b are not inadvertently severed. However, it is preferred in addition (see FIG. 2) to provide uncut spaces 90 between adjacent die-cut perforations 92 of each perforation line 94,96 defining the tear strip 50 therebetween so that uncut spaces 90 are disposed over each connecting portion 46a,46b and are of a sufficient width so that even if the die-cutting depth was inadvertently too great, with the cutter edge extending below the rear surface of the front cover 14, the connecting portions 46a,46b are not inadvertently severed. In this way, at least one of the connecting portions 46a,46b has uncut spaces 90 disposed thereover so that the connecting portion 46a,46b is covered by a corresponding continuous connecting part 100 of the front cover 14. This structural interrelationship between the die-cut perforations and the connecting portions provides a safety margin against inadvertent severing of the connecting portions as a result of tolerances in the die-cutting operation.

The waste web skeleton 74 surrounding the self-adhesive labels 2 is removed from the release liner 6, thereby to form a succession of self-adhesive labels 2 on the release liner 6 having the structure shown in FIGS. 1 to 3. The die-cutting may be performed by a plurality of dies, particularly when the tear strip 50 and/or the tear line 52 are present.

The self-adhesive label 2 of the invention has particular application in the labelling of curved containers, particularly those having a relatively small radius whereby the label 2 can wrap around as much as the entire circumference of a cylindrical container. In FIG. 1, the thickness of the various layers of the label are obviously exaggerated for clarity of illustration. However, it will be understood that when the label 2 is wrapped around a relatively small radius, the outer layer of the label 2, in particular the overlaminate 36, is required to be wrapped around a larger radius than the inner layer, for example the support piece 4. This difference in radii is accommodated readily by the label of the present invention because the free end 24 of the front panel 14, which retains the label 2 in its closed configuration by being adhered to the second portion 42 of the support piece 4, is able to move longitudinally relative to the first portion 40 of the support piece 4, i.e. towards first portion 40 of the support piece 4 to reduce the gap 44, thereby to ensure that the label 2 is retained securely in its folded configuration on the cylindrical container without unsightly rucking or folding, or tension causing inadvertent opening of the label 2. This longitudinal movement is permitted by the provision of the gap 44 and the connecting portions 46 which are sufficiently thin (in thickness) and narrow (in width) so as to be able to be collapsed, or even be severed by tearing, when the gap 44 is reduced in width as a result of movement together of the first and second portions 40,42.

Therefore as a result of the provision of windows or openings 49a,49b,49c in the single self-adhesive support piece 4 of the label 2, by removal of material from the self-adhesive support piece 4, this provides areas 46a,46b of the self-adhesive support piece 4 that do not lead to crumpling of the material of the label when labelling a curved surface, while retaining the structure and advantages of a single self-adhesive support piece 4.

FIG. 7 shows a cylindrical container 80 being labelled automatically with a self-adhesive label 2 of the invention and FIG. 8 shows the container 80 when labelled with the self-adhesive label 2. As shown in FIG. 7, during the labelling operation, the web of release liner 6, carrying a succession of self-adhesive labels 2 along its length, is pulled back over a body 82 defining a re-entrant angle, in a direction shown by the arrow A, so that labels 2 are successively fed off from the release liner 6 onto respective containers 80 to be labelled. FIG. 7 shows a container 80 during the middle of the labelling step when the label 2 has only partially been applied to the container 80. The container 80 is rotated as shown by the arrow B and the leading edge 84 of the self-adhesive label 2 is adhered to the outer cylindrical surface 86 of the container 80. As the container 80 is progressively rotated, eventually the trailing edge 88 of the label 2 becomes free of the release liner 6. In practice, the trailing edge 88 comprises the free end 24 of the front panel 14 which is adhered to the second portion 42 of the support piece 4, and accordingly connected to the first portion 40 of the support piece 4 by the connecting portions 46 which bridge the gap 44. As a result of there being a single integral support piece 4, with the two portions 40 and 42 being integrally connected by the connecting portions 46, in the phase of the labelling step shown in FIG. 7, at which the trailing edge 88 of the label 2 is free of the release liner 6 prior to being adhered to the container surface 86, the integral support piece structure prevents inadvertent rotational or lateral movement of the trailing edge 88 relative to the body portion 26 of the label 2, and also prevents inadvertent radial movement of the trailing edge 88, thereby preventing the label from flapping open. This tends to prevent or at least reduce mis-labelling problems because a unitary support piece 4 is provided, which provides enhanced rigidity to the support piece structure as compared to two separate support piece portions, and as compared to a single support piece which does not extend as far as the trailing edge.

However, as shown in FIG. 8, as a result of the provision of the gap 44 and the connecting portions 46, when the trailing edge 88 is ultimately adhered to the cylindrical outer surface 86 of the container 80, the trailing edge 88 is free to be pulled longitudinally inwardly towards the body portion 26 of the label so as to accommodate the difference in radii between the outer and inner layers of the label 2. As shown in an exaggerated manner in FIG. 8, the gap 44 is correspondingly reduced in width as a result of accommodating the radii difference. As described above, the connecting portions 46 are sufficiently thin and narrow so as readily to be able to be collapsed when the gap 44 is reduced in width. In practice, the connecting portions 46 can be collapsed inwardly in a concertina-like fashion, but since the material forming the connecting portions 46 is so thin and narrow in width, and since the connecting portions 46 are at the rear of the label remote from the front cover 14 and the overlying overlaminate 36, this deformation of the connecting portions 46 cannot be perceived by a user viewing the labelled product.

When it is desired to open the label 2, a user manually grabs the tear strip 50 and pulls it away so as to separate the free end 24 of the front panel 14 from the body portion 26 of the label 2. The body portion 26 can then be accessed and read by the user. The entire folded leaflet 12, apart from the free end 24 which remains adhered to the second portion 42 of the support piece 4, can be pulled away from the first portion 40 of the support piece 4, together with its associated portion of overlaminate 36 adhered thereto, by delaminating the overlaminate 36 from the portion of the upper surface of the end portion 32 of the support piece 4 which lies between the folded edge 18 and the tear line 52 and tearing the overlaminate along the tear line 52.

Various modifications can be made to the label and method of the invention which will be apparent to those skilled in the art. For example, the tear strip may be omitted and the free end of the front panel may be releasably adhered to the support piece. In the method of the invention, a plurality of self-adhesive labels may be produced across the width of the labelstock material, as well known in the art, with the labelstock material thereafter being divided into separate respective reels of self-adhesive labels.

I claim:

1. A self-adhesive label carried on a backing of release material comprising a multilaminar label portion having a front cover panel having an end, the multilaminar label portion having a first part, and a second part comprising the and of the front cover panel, and a self-adhesive support piece upon which the multilaminar label portion is disposed, the support piece comprising first and second portions which are spaced apart to define a gap therebetween and at least one connecting portion extending across the gap and integrally connecting the first and second portions together, the first and second parts of the multilaminar label portion being respectively adhered to the first and second portions of the support piece, and the self-adhesive surface of the support piece being adhered to a backing of release liner, wherein the connecting portion are located only inwardly of longitudinal edges of the label:

wherein the second portion of the support piece is longitudinally movable relative to the first portion of the support piece towards the first portion of the support piece to reduce the gap, said longitudinal movement being permitted by the provision of the gap and the at least one connecting portion which is sufficiently thin and narrow so as to be collapsed when said gap is reduced in width as a result of said movement together of said first and second portions.

2. A self-adhesive label according to claim 1 wherein the self-adhesive label further comprises a self-adhesive over laminate material overlying and adhere by the self-adhesive surface thereof to the upper surface of the multilaminar label portion.

3. A self-adhesive label according to claim 2 wherein an end part of the self-adhesive over laminate material is adhered by the self-adhesive surface thereof to an end part of the first portion of the support piece which is not covered by the multilaminar label portion.

4. A self-adhesive label according to claim 1 wherein a plurality of mutually spaced connecting portions extend across the gap.

5. A self-adhesive label according to claim 4 wherein the connecting portions are parallel and longitudinally directed along the length of the label.

6. A self-adhesive label according to claim 4 wherein the connecting portions are located only inwardly of longitudinal edges of the label.

7. A self-adhesive label according to claim 1 wherein the end of the front cover panel is permanently adhered to the second portion by a layer of adhesive.

8. A self-adhesive label according to claim 7 further comprising at least one tear line which extends at least partially through the front cover panel and is transversely directed across the width of the label.

9. A self-adhesive label according to claim 8 wherein the at least one tear line overlies the gap and the at least one connecting portion.

10. A self-adhesive label according to claim 9 wherein the at least one tear line comprises a series of perforations separated by spaces therebetween, and at least one of the connecting portions has spaces disposed there over so that the connecting portion is covered by a corresponding continuous connecting part of the front cover.

11. A self-adhesive label according to claim 1 wherein the multilaminar label portion is selected from the group consisting of a folded leaflet and a booklet.

12. A self-adhesive label carried on a backing of release material comprising a multilaminar label portion having a first part and a second part, an a self-adhesive support piece upon which the multilaminar of portion is disposed, the support piece comprising first and second portions having at least one opening formed therein between said first and second portions of the support piece to define in the support piece at least one longitudinally extending portion which integrally connects the first and second portions together, the first and second parts of the multilaminar label portion being respectively adhered to the first and second portions of the support piece, and the self-adhesive surface of the support piece being adhered to a backing of release liner, wherein the connecting portion are located only inwardly of longitudinal edges of the label:

wherein the second portion of the support piece is longitudinal movable relative to the first portion of the support piece towards the first portion of the support piece to reduce the opening, said longitudinal movement being permitted by the provision of the opening and the at least one connecting portion which is sufficiently thin and narrow so as to be collapsed when said opening is reduced in width as a result of said movement together of said first and second portions.

13. A self-adhesive label according to claim 12 wherein the self-adhesive label further comprises a self-adhesive over laminate material overlying and adhere by the self-adhesive surface thereof to the upper surface of the multilaminar label portion.

14. A self-adhesive label according to claim 13 wherein an end part of the self-adhesive over laminate material is adhered by the self-adhesive surface thereof to an end part of the first portion of the support piece which is not covered by the multilaminar label portion.

15. A self-adhesive label according to claim 12 wherein a plurality of mutually spaced longitudinally extending portions integrally connect the first and second portions of the support piece.

16. A self-adhesive label according to claim 15 wherein the longitudinally extending portions are parallel and directed along the length of the label.

17. A self-adhesive label according to claim 16 wherein the longitudinally extending portions are located only inwardly of longitudinal edges of the label, thereby to define a plurality of openings in the support piece.

18. A self-adhesive label according to claim 12 wherein at least one of the plurality of openings in the support piece comprises a window in the support piece, the window being surrounded by the support piece.

19. A self-adhesive label according to claim 12 wherein the second part comprises a free end of a front cover panel which is permanently adhered to the second portion by a layer of adhesive.

20. A self-adhesive label according to claim 12 further comprising at least one tear line which extends at least partially through the multilaminar label portion and is transversely directed across the width of the label to separate the first and second parts of the multilaminar label portion.

21. A self-adhesive label according to claim 20 wherein the at least one tear line overlies the at least one opening and the at least one longitudinally extending portion.

22. A self-adhesive label according to claim 21 wherein the at least one tear line comprises a series of perforations separated by spaces therebetween, and at least one of the longitudinally extending portions has spaces disposed there over so that th longitudinally extending portion is covered by a corresponding continuous connecting part of the front cover.

23. A self-adhesive label according to claim 12 wherein the a least one opening is located under and covered by a body portion of the multilaminar label portion which comprises the first part of the multilaminar label portion.

24. A self-adhesive label according to claim 12 wherein the multilaminar label portion is selected from the group consisting of a folded leaflet and a booklet.

* * * * *